United States Patent
Coteus et al.

(10) Patent No.: US 9,442,512 B1
(45) Date of Patent: Sep. 13, 2016

(54) INTERFACE CLOCK FREQUENCY SWITCHING USING A COMPUTED INSERTION DELAY

(71) Applicant: International Business Machines Corporation, Armonk, NY (US)

(72) Inventors: Paul W. Coteus, Yorktown, NY (US); Daniel M. Dreps, Georgetown, TX (US); Hillery C. Hunter, Chappaqua, NY (US); Kyu-hyoun Kim, Chappaqua, NY (US); Glen A. Wiedemeier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/946,993

(22) Filed: Nov. 20, 2015

(51) Int. Cl.
*G06F 1/00* (2006.01)
*G06F 1/14* (2006.01)

(52) U.S. Cl.
CPC ..................... *G06F 1/14* (2013.01)

(58) Field of Classification Search
CPC .............................. G06F 1/04–1/10
See application file for complete search history.

(56) References Cited

U.S. PATENT DOCUMENTS

| | | | |
|---|---|---|---|
| 5,847,965 A | 12/1998 | Cheng | |
| 5,859,986 A | 1/1999 | Marenin | |
| 7,301,313 B1 | 11/2007 | Hart et al. | |
| 8,028,531 B2 | 10/2011 | Phan et al. | |
| 8,572,544 B2 | 10/2013 | Durbha et al. | |
| 2003/0204697 A1* | 10/2003 | Kessler | G06F 13/1689 711/167 |
| 2009/0033155 A1 | 2/2009 | Kanno et al. | |
| 2010/0231281 A1 | 9/2010 | Douskey et al. | |
| 2012/0235716 A1* | 9/2012 | Dubost | H03L 7/0805 327/147 |
| 2013/0047004 A1* | 2/2013 | Hwang | G06F 9/5094 713/300 |
| 2014/0103985 A1 | 4/2014 | Andreev et al. | |
| 2014/0229666 A1 | 8/2014 | Schoenborn et al. | |
| 2014/0281653 A1* | 9/2014 | Gilda | G06F 1/12 713/400 |
| 2014/0347108 A1 | 11/2014 | Zerbe et al. | |
| 2015/0121138 A1* | 4/2015 | Rabinovitch | G06F 11/273 713/300 |

FOREIGN PATENT DOCUMENTS

| | | |
|---|---|---|
| WO | 9849761 | 11/1998 |
| WO | 0229974 | 4/2002 |
| WO | 03017563 | 2/2003 |
| WO | 2013052186 | 4/2013 |

OTHER PUBLICATIONS

A. Maxim, Notice of Violation of IEEE Publication Principles "A 0.16-2.55-GHz CMOS active clock deskewing PLL using analog phase interpolation," Solid-State Circuits, IEEE Journal of Solid-State Circuits, vol. 40, No. 1, Jan. 2005, pp. 110-131.

J Zhou, et al., "A Self-Driven Soft-Switching Voltage Regulator for Future Microprocessors," IEEE Transactions on Power Electronics, vol. 20, No. 4, Jul. 2005, 9 pages.

\* cited by examiner

*Primary Examiner* — Mohammed Rehman
(74) *Attorney, Agent, or Firm* — Cantor Colburn LLP

(57) ABSTRACT

An aspect includes a method of interface clock frequency switching control that includes determining a first clock delay adjustment of a clock signal for an interface at a first clock frequency. A controller determines a second clock delay adjustment for the interface operated at a second clock frequency. The controller computes an insertion delay between the clock signal and a data signal of the interface based on the first clock delay adjustment and frequency and the second clock delay adjustment and frequency. The controller also computes a third clock delay adjustment to operate the interface at a third clock frequency based on the insertion delay and a relative difference between the third clock frequency and the second clock frequency. The clock signal is adjusted based on the third clock delay adjustment to align timing of the clock signal with the data signal at the third clock frequency.

17 Claims, 6 Drawing Sheets

INTERFACE CLOCK FREQUENCY SWITCHING USING A COMPUTED INSERTION DELAY

BACKGROUND

The present invention relates to computer system interfaces, and more specifically, to interface clock frequency switching in a computer system.

In some computer system applications, interface power, such as power for a communication interface between a memory controller and memory, takes a large portion of the total system power. For efficient power management, it is desirable to adjust power and peak bandwidth depending on the current work load. For processor core power adjustments, dynamic voltage and frequency scaling (DVFS) has been widely used. Interfaces cannot typically use DVFS for power management, as it takes an extended period of time to adapt to a new frequency since an interface data rate change would require retraining of timing values.

SUMMARY

According to one embodiment, a method of interface clock frequency switching control in a computer system includes determining, by a controller, a first clock delay adjustment of a clock signal for an interface of the computer system operated at a first clock frequency. The controller determines a second clock delay adjustment of the clock signal for the interface operated at a second clock frequency. The controller computes an insertion delay between the clock signal and a data signal of the interface based on the first clock delay adjustment, the first clock frequency, the second clock delay adjustment, and the second clock frequency. The controller also computes a third clock delay adjustment of the clock signal to operate the interface at a third clock frequency based on the insertion delay and a relative difference between the third clock frequency and the second clock frequency. The clock signal is adjusted based on the third clock delay adjustment to align timing of the clock signal with the data signal at the third clock frequency.

According to another embodiment, a system for interface clock frequency switching in a computer system includes an interface with at least one data line and at least one clock line. The system also includes a phase rotator at a receiver portion of the interface. The phase rotator is operable to receive a clock signal from the at least one clock line and drive clocking of a data latch to capture a data signal from the at least one data line. The system further includes a controller that determines a first clock delay adjustment of the clock signal at a first clock frequency and determines a second clock delay adjustment of the clock signal at a second clock frequency. The controller is further configured to compute an insertion delay between the clock signal and the data signal based on the first clock delay adjustment, the first clock frequency, the second clock delay adjustment, and the second clock frequency. The controller is also configured to compute a third clock delay adjustment of the clock signal to operate the interface at a third clock frequency based on the insertion delay and a relative difference between the third clock frequency and the second clock frequency. The clock signal is adjusted based on the third clock delay adjustment to align timing of the clock signal with the data signal at the third clock frequency.

According to yet another embodiment, a computer program product for interface clock frequency switching control in a computer system includes a computer readable storage medium having program instructions embodied therewith. The program instructions are executable by processing circuitry to cause the processing circuitry to determine a first clock delay adjustment of a clock signal for an interface of the computer system operated at a first clock frequency and determine a second clock delay adjustment of the clock signal for the interface operated at a second clock frequency. An insertion delay is computed between the clock signal and a data signal of the interface based on the first clock delay adjustment, the first clock frequency, the second clock delay adjustment, and the second clock frequency. A third clock delay adjustment of the clock signal is computed to operate the interface at a third clock frequency based on the insertion delay and a relative difference between the third clock frequency and the second clock frequency. The clock signal is adjusted based on the third clock delay adjustment to align timing of the clock signal with the data signal at the third clock frequency.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to dynamic timing adjustments for rapid data centering and de-skewing of a computer system interface when switching clock frequencies. Control code settings for phase rotators can be computed on-the-fly for an arbitrary frequency. A training procedure can be used to find an optimal code setting for a phase rotator at one or more frequencies to determine an insertion delay. Upon a later frequency change, the insertion delay and relative scaling of a new frequency with respect to a previous frequency can be used to determine an updated insertion delay for de-skewing and adjusting clock-to-data timing alignment. The ability to adapt to arbitrary frequency settings and make incremental updates to maintain alignment removes the need to develop a large look-up table for timing that may not accurately match temperature and delay effects of the computer system. A similar method can also be applied to a delay-locked loop based variable delay line to dynamically adjust timing.

Figure 1:
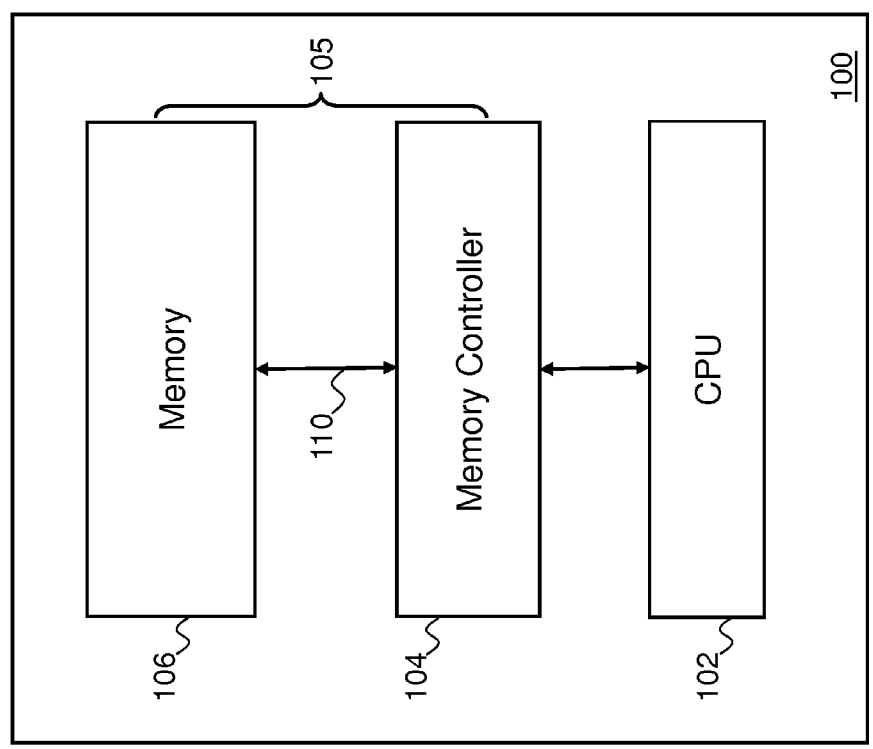
FIG. 1 is a block diagram of an exemplary system according to embodiments of the invention.

FIG. 1 illustrates a block diagram of a system 100, which is a computer system that supports interface clock frequency switching in accordance with an embodiment. The system 100 depicted in FIG. 1 includes a computer processor 102, memory 106 including multiple memory devices, and a memory controller 104 for reading and storing data in the memory 106 via an interface 110. Collectively, the memory controller 104 and the memory 106 are referred to as a memory system 105. The computer processor 102 and the interface 110 may operate at different voltage levels and frequencies with respect to each other. The computer processor 102 can be a single core or multi-core processor, where each core may have different voltage and/or frequency settings.

In one embodiment the memory controller 104 is coupled to the computer processor 102 and receives read or write requests from the computer processor 102. The memory controller 104 can control signal timing, such as data and clock signal timing, on the interface 110. The memory controller 104 and memory 106 can perform localized timing adjustments to account for delay mismatches between various signals as received. For example, the memory 106 can perform localized de-skewing and data centering with respect to signals from the memory controller 104 received at the memory 106. Similarly, the memory controller 104 can perform localized de-skewing and data centering with respect to signals from the memory 106.

The system 100 is one example of a configuration that may be utilized to perform the processing described herein. Although the system 100 has been depicted with only a memory 106, memory controller 104, and computer processor 102, it will be understood that other embodiments would also operate in other systems including additional elements, e.g., multiple computers processors 102 and multiple levels of memory 106. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102. Other examples of the interface 110 may be implemented within the system 100, such as interfaces to access input/output channels, board/module interfaces, chip-to-chip interfaces, and the like.

Figure 2:
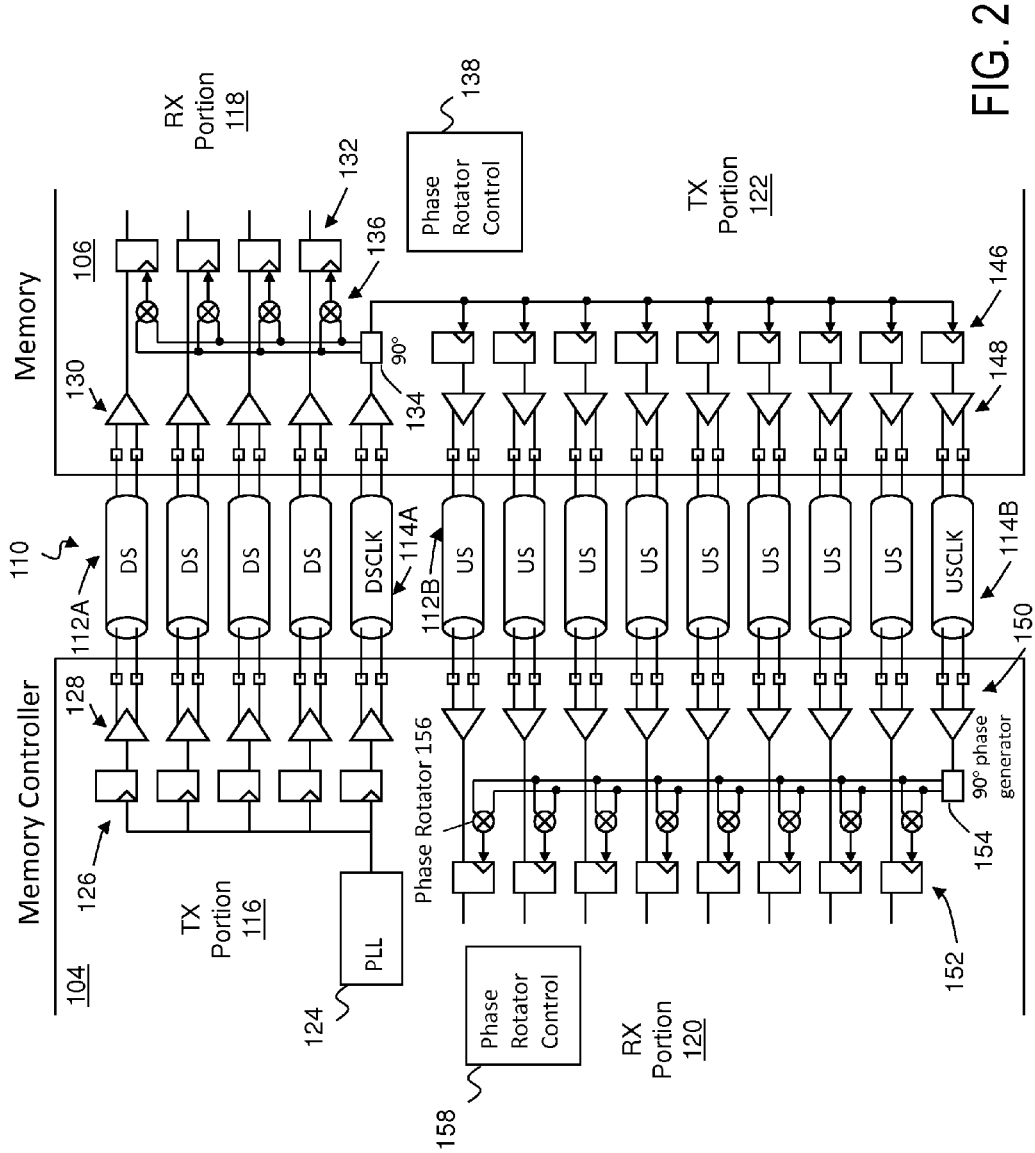
FIG. 2 is a block diagram of an interface of the system of FIG. 1 according to an embodiment of the invention.

FIG. 2 is a block diagram of the interface 110 of the system 100 of FIG. 1 according to an embodiment. The interface 110 includes at least one data line 112A and at least one clock line 114A in a downstream and at least one data line 112B and at least one clock line 114B in an upstream direction with respect to the memory controller 104. The memory controller 104 includes a transmitter portion 116 that interfaces with a receiver portion 118 of the memory 106. Similarly, the memory controller 104 includes a receiver portion 120 that interfaces with a transmitter portion 122 of the memory 106. In the example of FIG. 2, a phase-locked loop 124 provides a clock signal to latches 126 that feed drivers 128 of at least one data line 112A and at least one clock line 114A to buffers 130 of the receiver portion 118. Buffers 130 of the at least one data line 112A can feed latches 132 of the receiver portion 118. A ninety degree phase generator 134 can be used to feed a clock signal from the at least one clock line 114A to phase rotators 136. A phase rotator control 138 can be used to configure timing of the phase rotators 136.

Similar to the transmitter portion 116 and the receiver portion 118, the transmitter portion 122 of the memory 106 provides a clock signal to latches 146 that feed drivers 148 of at least one data line 112B and at least one clock line 114B to buffers 150 of the receiver portion 120. Buffers 150 of the at least one data line 112B can feed latches 152 of the receiver portion 120. A ninety degree phase generator 154 can be used to feed a clock signal from the at least one clock line 114B to phase rotators 156. A phase rotator control 158 can be used to configure timing of the phase rotators 156.

Figure 3:
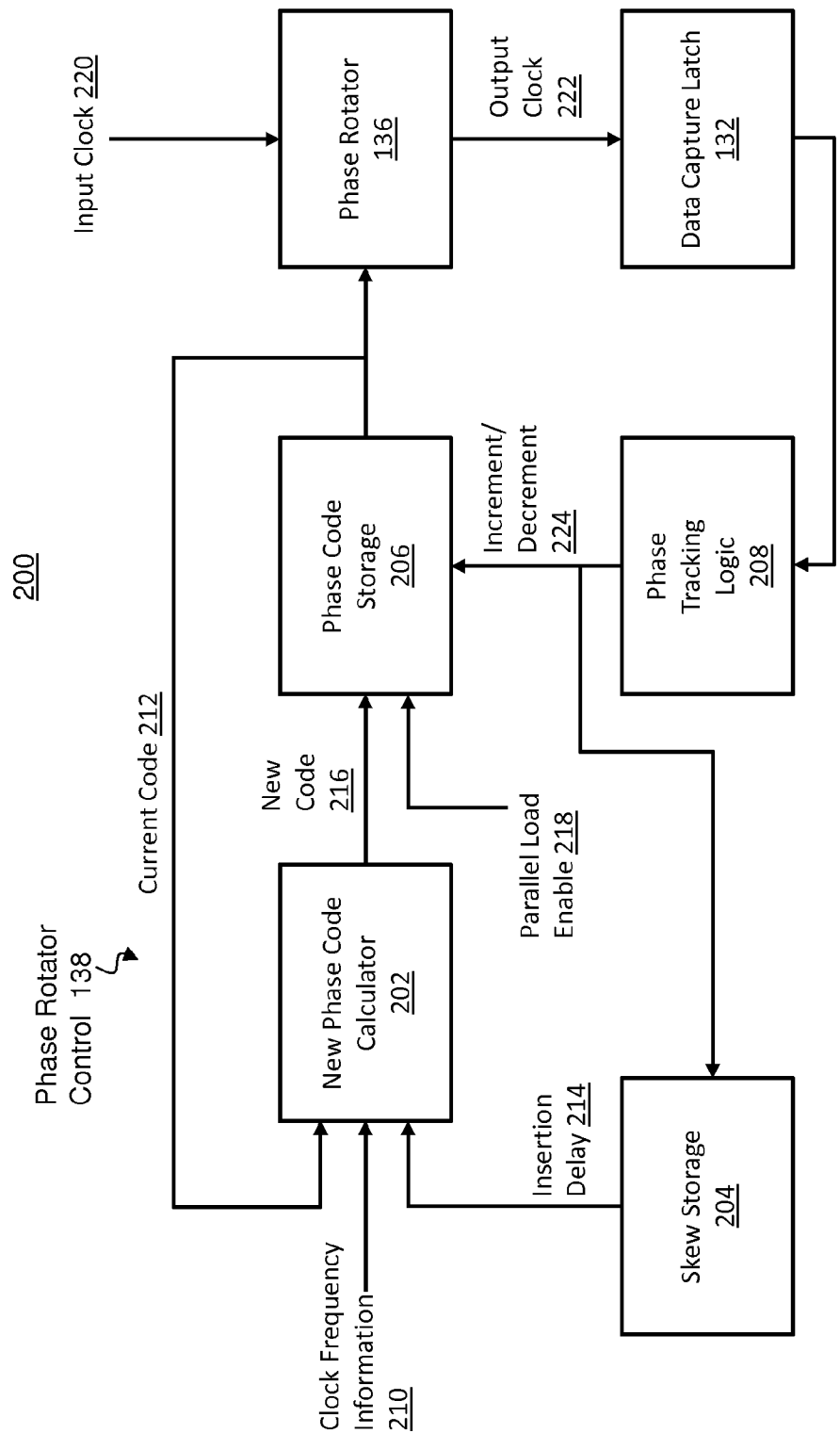
FIG. 3 is a block diagram of a phase code control according to an embodiment of the invention.

FIG. 3 is a block diagram of a phase code controller 200 according to an embodiment. The example of FIG. 3 is depicted with respect to the phase rotator control 138 and instances of the phase rotator 136 and data capture latch 132 of FIG. 2 but can also be implemented with respect to the phase rotator control 158 and instances of the phase rotator 156 and data capture latch 152 of FIG. 2. The phase rotator control 138 may be implemented in a state machine or firmware, for instance. In an embodiment, the phase rotator control 138 can include a new phase code calculator 202, skew storage 204, phase code storage 206, and phase tracking logic 208. The new phase code calculator 202 can receive clock frequency information 210, such as a desired frequency of operation, along with a current code 212 that defines a setting for a clock delay adjustment, and an insertion delay 214 from skew storage 204. The new phase code calculator 202 can compute a new code 216 for phase code storage 206 which is output from the phase code storage 206 to the phase rotator 136 and to the new phase code calculator 202 as current code 212. The phase code storage 206 may also receive a parallel load enable 218 to support parallel updates for multiple instances of the phase rotator 136. The current code 212 adjusts phase alignment of an input clock 220 as an output clock 222, which controls data capture timing at an instance of data capture latch 132. Phase tracking logic 208 can be used to monitor phase timing at data capture latch 132, which may result in incrementing or decrementing values stored in the skew storage 204 (e.g., insertion delay 214) and in the phase code storage 206 (e.g., current code 212).

To perform efficient timing updates for frequency changes according to an embodiment, upon initialization a default or first clock frequency (f1), the phase rotator control 138 can sweep settings (i.e., values of current code 212) of the phase rotator 136 to find an optimum code setting for output clock 222 that aligns with the data eye center of a data signal on data capture latch 132. This setting represents all mismatch delays in silicon and skews between the clock and data as received. This example also assumes that the clock and data are launched by a same edge inside the transmitting chip (e.g., at latches 126 of memory controller 104), and the linearity of the phase rotator 136 is ideal. As an example, if an ideal phase delay setting for the first clock frequency f1 is 100 degrees out of 360 degrees, this value may be assignable as a phase code that is interpreted by phase rotator 136. The phase delay can be expressed as a first clock delay adjustment (d1) in units of time or an angle.

The phase rotator control 138 can also sweep settings of the phase rotator 136 to find an optimum code setting for output clock 222 that aligns with the data eye center of a data signal on data capture latch 132 with respect to a second clock frequency (f2) to find a second setting as a second clock delay adjustment (d2) which may be expressed as time or an angle (e.g., 40 degrees). Using the first clock delay adjustment d1, the first clock frequency f1, the second clock delay adjustment d2, and the second clock frequency f2, the phase rotator control 138 can compute an insertion delay (D), such as insertion delay 214 of FIG. 3. For instance, unit interval one (UI1) equals 1/f1 and unit interval two (UI2) equals 1/f2. When d1 and d2 are express as angles in degrees, the following equations can be used to solve for D.

$$(d1/360)*UI1=D*UI1 \bmod UI1 \quad \text{Equation 1:}$$

$$(d2/360)*UI2=D*UI2 \bmod UI2 \quad \text{Equation 2:}$$

Due to use of the modulus function in equations 1 and 2, individually there may be several values of D that solve each equation. By solving for both equations 1 and 2, the phase rotator control 138 can select a lower value of a first clock skew computation (D solution of equation 1) relative to a second clock skew computation (D solution of equation 2) such that the smallest positive delay value is used to minimize adjustment delays. This value of D can be stored in skew storage 204 as insertion delay 214. The most recent value of the clock delay adjustment (i.e., second clock delay adjustment d2) can be stored in phase code storage 206 to set an initial value (d_init) that is mapped to format for use by phase rotator 136 as the current code 212. While operation continues at the second clock frequency f2, the phase rotator control 138 keeps track of the current code 212 using a feedback loop, where the phase tracking logic 208 makes periodic adjustments to D and d_init. If the current code 212 goes beyond d_init+/−180 degrees, then the phase rotator control 138 can increment or decrement D and d_init by half of the current unit interval. The new value of D (i.e., insertion delay 214 as adjusted) represents the total insertion delay at the current voltage and temperature.

When the phase rotator control 138 is commanded to change the output clock 222 to accommodate a new arbitrary frequency (e.g., third clock frequency f3), a new code 216 can be computed (d3) based on the updated value of D (i.e., current value of insertion delay 214) and unit interval three (UI3), where UI3=1/f3. Using the updated value of D, d3 can be computed using equation 3, and d_init can be set to d3 upon switching to the third clock frequency f3.

$$(d3/360)*UI3=D*UI3 \bmod UI3 \quad \text{Equation 3:}$$

Figure 4:
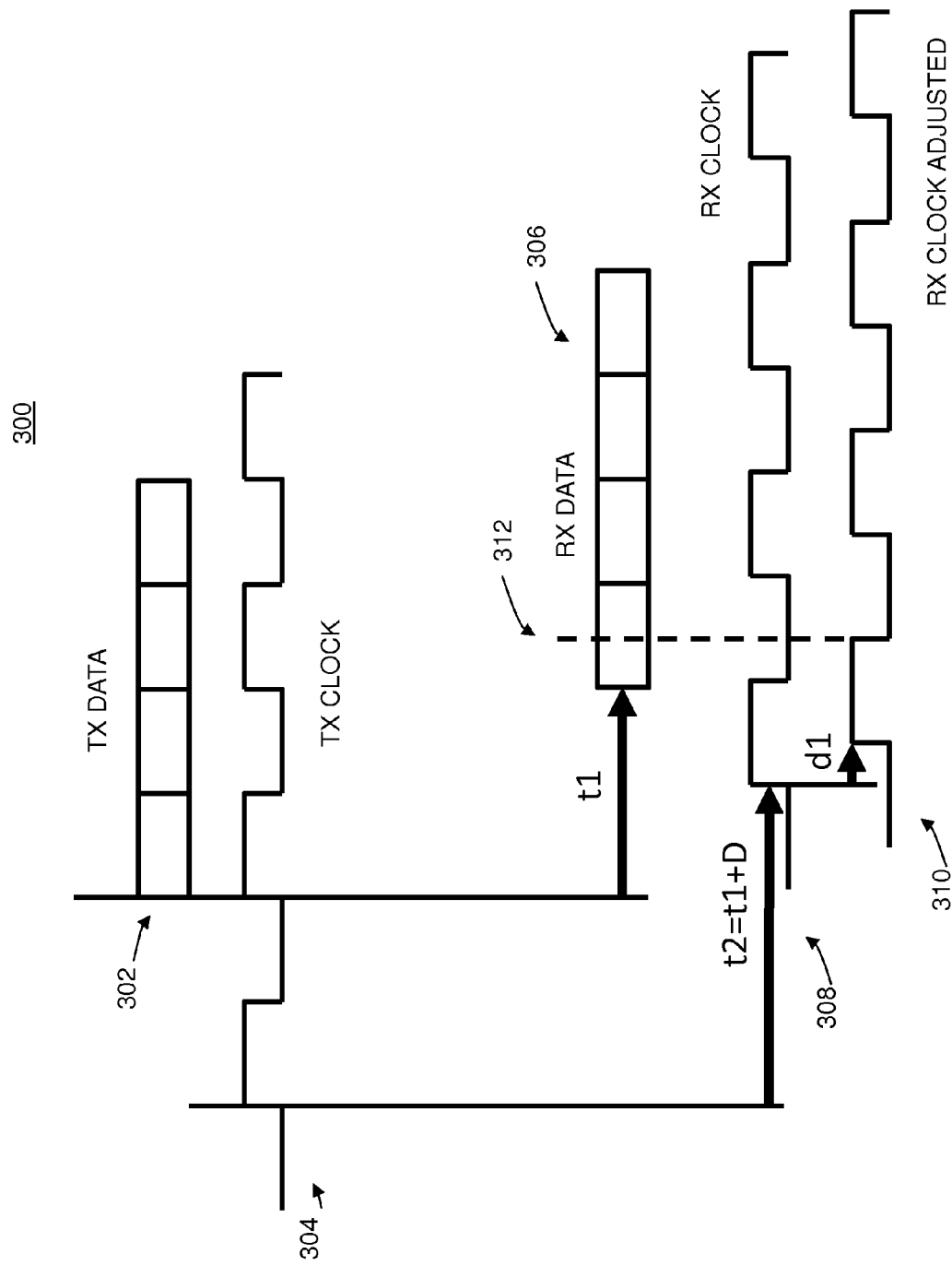
FIG. 4 is a skew extraction example according to an embodiment of the invention.

FIG. 4 is a skew extraction example 300 according to an embodiment. On a transmitter side of an interface, such as transmitter portion 116 of FIG. 2, transmitted data 302 is edge aligned with the transmitted clock 304 at the transmitter side of the interface 110 of memory controller 104 in FIG. 2. Due to differences in path length, clock trees, and the like, upon passing through the interface 110 of FIGS. 1 and 2, the received data 306 at receiver portion 118 has a different delay (t1) than the received clock 308 with a delay of t2, where t2=t1+D. A received clock adjustment 310 can be determined as time d1 to align the data eye center 312 of received data 306 with a clock edge by sweeping through different values of d2 until optimal alignment is achieved.

Figure 5:
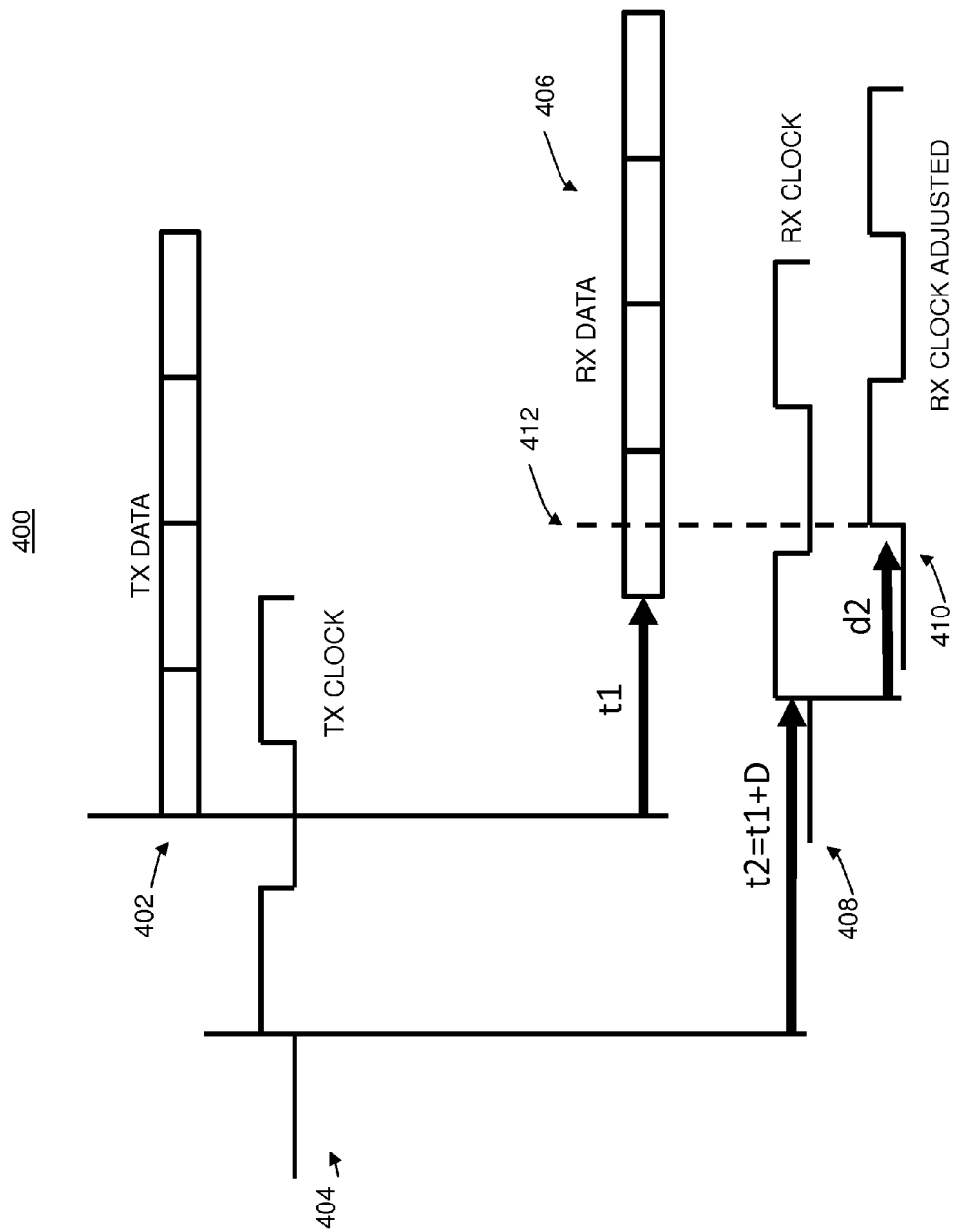
FIG. 5 is a phase code calculation example according to an embodiment of the invention.

FIG. 5 is a phase code calculation example 400 after a frequency change according to an embodiment. In the example of FIG. 5, transmitted data 402 is not edge aligned with transmitted clock 404 but is initially offset by about ninety degrees, i.e., data eye center aligned. Received data 406 is delayed by t1 and received clock 408 is delayed by t2, where t2=t1+D. An adjustment delay d2 can be computed for a received clock adjustment 410 to achieve alignment with a data eye center 412 using the previous value of D associated with a previous frequency and rescaling on a frequency change to compute adjustment delay d2.

Figure 6:
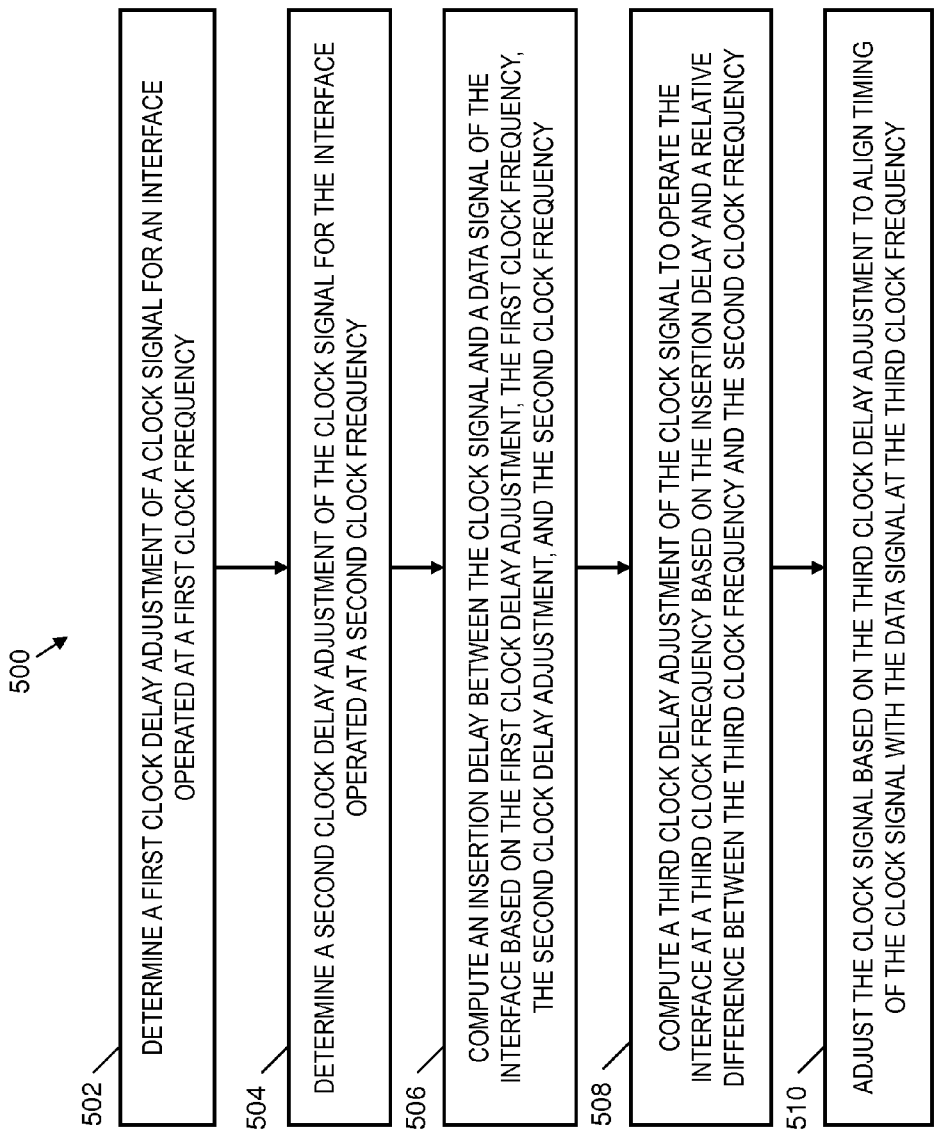
FIG. 6 is a process flow according to an embodiment of the invention.

FIG. 6 is a process flow of a method 500 according to an embodiment. The method 500 can be performed by various elements of the system 100 of FIG. 1, such as the phase rotator control 138 and/or phase rotator control 158 of FIG. 2, and is described in reference to FIGS. 1-5. Although a particular order of blocks is depicted and described with respect to FIG. 6, it will be understood that the order can be changed, and the blocks may be combined or further subdivided. For purposes of explanation, the method 500 is described with respect to the phase rotator control 138 as a controller configured to perform method 500.

At block 502, phase rotator control 138 determines a first clock delay adjustment d1 of a clock signal for a clock line 114A of an interface 110 of the system 100 operated at a first clock frequency f1. The first clock delay adjustment d1 of the clock signal can be determined by sweeping through a plurality of phase rotator code settings to identify an optimum code setting closest to a data eye center for the data signal of the interface 110 at the first clock frequency f1. The clock signal may be adjusted by changing a phase rotator code setting (e.g., current code 212) of a phase rotator 136 that drives clocking of a data capture latch 132 to capture the data signal at a receiver portion 118 of the interface 110.

At block 504, phase rotator control 138 determines a second clock delay adjustment d2 of the clock signal for clock line 114A of the interface 110 operated at a second clock frequency f2. The second clock delay adjustment d2 of the clock signal can be determined by sweeping through the phase rotator code settings to identify the optimum code setting closest to the data eye center for the data signal of the interface 110 at the second clock frequency f2.

At block 506, phase rotator control 138 computes an insertion delay D (e.g., insertion delay 214) between the clock signal and a data signal of the interface 110 based on the first clock delay adjustment d1, the first clock frequency f1, the second clock delay adjustment d2, and the second clock frequency f2. The insertion delay D between the clock signal and the data signal may be computed by selecting a lower value of a first clock skew computation (e.g., equation 1) and a second clock skew computation (e.g., equation 2), where the first clock skew computation is based on the first clock delay adjustment d1 and the first clock frequency f1, and the second clock skew computation is based on the second clock delay adjustment d2 and the second clock frequency f2. The insertion delay D can be scaled to offset the clock signal by a quarter cycle (i.e., ninety degrees) with respect to the data signal. While operating the clock signal at the second clock frequency f2, the phase rotator control 138 can periodically update the second clock delay adjustment d2 and the insertion delay D.

At block 508, phase rotator control 138 computes a third clock delay adjustment d3 of the clock signal to operate the interface 110 at a third clock frequency f3 based on the insertion delay D and a relative difference between the third clock frequency f3 and the second clock frequency f2. As an example, if there are 32 steps defined per ninety degrees of phase rotation, a phase rotation to align with ninety degrees may be determined as 32 steps—insertion delay D divided by a ratio of the unit interval time UI3 of the third clock frequency f3 to the unit interval time UI2 of the second clock frequency f2 as the third clock delay adjustment d3.

At block 610, phase rotator control 138 adjusts the clock signal based on the third clock delay adjustment d3 to align timing of the clock signal with the data signal at the third clock frequency f3 (e.g., at data eye center 312 or 412). The third clock delay adjustment d3 can be computed as a ninety degree offset of the insertion delay D as scaled by a ratio of the third clock frequency f3 with respect to the second clock frequency f2. In an alternate embodiment, the third clock delay adjustment d3 alters timing in a variable delay line of a delay-locked loop, when implemented in a delay-locked loop.

Technical effects and benefits include dynamic computation and adjustment of skew values and clock delays to maintain data eye centering at a receiver side of an interface for arbitrary clock frequency changes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of interface clock frequency switching control in a computer system, the method comprising:
    determining, by a controller, a first clock delay adjustment of a clock signal on a clock line of an interface of the computer system operated at a first clock frequency;
    changing the clock signal on the clock line from the first clock frequency to a second clock frequency;
    determining, by the controller, a second clock delay adjustment of the clock signal on the clock line of the interface operated at the second clock frequency;
    computing, by the controller, an insertion delay between the clock signal and a data signal of the interface based on the first clock delay adjustment, the first clock frequency, the second clock delay adjustment, and the second clock frequency;
    periodically updating the second clock delay adjustment and the insertion delay while operating the clock signal at the second clock frequency and prior to changing the clock signal from the second clock frequency to a third clock frequency;
    computing, by the controller, a third clock delay adjustment of the clock signal to operate the clock line of the interface at the third clock frequency based on the insertion delay and a relative difference between the third clock frequency and the second clock frequency; and
    adjusting the clock signal based on the third clock delay adjustment to align timing of the clock signal with the data signal at the third clock frequency.

2. The method according to claim 1, wherein the first clock delay adjustment of the clock signal is determined by sweeping through a plurality of phase rotator code settings to identify an optimum code setting closest to a data eye center for the data signal of the interface at the first clock frequency, and the second clock delay adjustment of the clock signal is determined by sweeping through the phase rotator code settings to identify the optimum code setting closest to the data eye center for the data signal of the interface at the second clock frequency.

3. The method according to claim 1, wherein the insertion delay between the clock signal and the data signal is computed by selecting a lower value of a first clock skew computation and a second clock skew computation, wherein the first clock skew computation is based on the first clock delay adjustment and the first clock frequency, and the second clock skew computation is based on the second clock delay adjustment and the second clock frequency.

4. The method according to claim 1, wherein the insertion delay is scaled to offset the clock signal by a quarter cycle with respect to the data signal.

5. The method according to claim 1, wherein the third clock delay adjustment is computed as a ninety degree offset of the insertion delay as scaled by a ratio of the third clock frequency with respect to the second clock frequency.

6. The method according to claim 1, wherein the clock signal is adjusted by changing a phase rotator code setting of a phase rotator that drives clocking of a data latch to capture the data signal at a receiver portion of the interface.

7. The method according to claim 1, wherein the third clock delay adjustment alters timing in a variable delay line of a delay-locked loop.

8. A system for interface clock frequency switching in a computer system, the system comprising:
    an interface comprising at least one data line and at least one clock line;
    a phase rotator at a receiver portion of the interface, the phase rotator operable to receive a clock signal from the at least one clock line and drive clocking of a data latch to capture a data signal from the at least one data line; and
    a controller configured to perform:
        determining a first clock delay adjustment of the clock signal at a first clock frequency;
        changing the clock signal from the first clock frequency to a second clock frequency;
        determining a second clock delay adjustment of the clock signal at the second clock frequency;
        computing an insertion delay between the clock signal and the data signal based on the first clock delay adjustment, the first clock frequency, the second clock delay adjustment, and the second clock frequency;
        periodically updating the second clock delay adjustment and the insertion delay while operating the clock signal at the second clock frequency and prior to changing the clock signal from the second clock frequency to a third clock frequency;

computing a third clock delay adjustment of the clock signal to operate the interface at the third clock frequency based on the insertion delay and a relative difference between the third clock frequency and the second clock frequency; and adjusting the clock signal based on the third clock delay adjustment to align timing of the clock signal with the data signal at the third clock frequency.

9. The system according to claim 8, wherein the first clock delay adjustment of the clock signal is determined by sweeping through a plurality of phase rotator code settings to identify an optimum code setting closest to a data eye center for the data signal of the interface at the first clock frequency, and the second clock delay adjustment of the clock signal is determined by sweeping through the phase rotator code settings to identify the optimum code setting closest to the data eye center for the data signal of the interface at the second clock frequency.

10. The system according to claim 8, wherein the insertion delay between the clock signal and the data signal is computed by selecting a lower value of a first clock skew computation and a second clock skew computation, wherein the first clock skew computation is based on the first clock delay adjustment and the first clock frequency, and the second clock skew computation is based on the second clock delay adjustment and the second clock frequency.

11. The system according to claim 8, wherein the insertion delay is scaled to offset the clock signal by a quarter cycle with respect to the data signal.

12. The system according to claim 8, wherein the third clock delay adjustment is computed as a ninety degree offset of the insertion delay as scaled by a ratio of the third clock frequency with respect to the second clock frequency.

13. A computer program product for interface clock frequency switching control in a computer system, the computer program product comprising a computer readable storage medium having program instructions embodied therewith, the program instructions executable by processing circuitry to cause the processing circuitry to:

determine a first clock delay adjustment of a clock signal on a clock line of an interface of the computer system operated at a first clock frequency;

change the clock signal on the clock line from the first clock frequency to a second clock frequency;

determine a second clock delay adjustment of the clock signal on the clock line of the interface operated at the second clock frequency;

compute an insertion delay between the clock signal and a data signal of the interface based on the first clock delay adjustment, the first clock frequency, the second clock delay adjustment, and the second clock frequency;

periodically update the second clock delay adjustment and the insertion delay while operating the clock signal at the second clock frequency and prior to changing the clock signal from the second clock frequency to a third clock frequency;

compute a third clock delay adjustment of the clock signal to operate the clock line of the interface at the third clock frequency based on the insertion delay and a relative difference between the third clock frequency and the second clock frequency; and adjust the clock signal based on the third clock delay adjustment to align timing of the clock signal with the data signal at the third clock frequency.

14. The computer program product according to claim 13, wherein the first clock delay adjustment of the clock signal is determined by sweeping through a plurality of phase rotator code settings to identify an optimum code setting closest to a data eye center for the data signal of the interface at the first clock frequency, and the second clock delay adjustment of the clock signal is determined by sweeping through the phase rotator code settings to identify the optimum code setting closest to the data eye center for the data signal of the interface at the second clock frequency.

15. The computer program product according to claim 13, wherein the insertion delay between the clock signal and the data signal is computed by selecting a lower value of a first clock skew computation and a second clock skew computation, wherein the first clock skew computation is based on the first clock delay adjustment and the first clock frequency, and the second clock skew computation is based on the second clock delay adjustment and the second clock frequency.

16. The computer program product according to claim 13, wherein the insertion delay is scaled to offset the clock signal by a quarter cycle with respect to the data signal.

17. The computer program product according to claim 13, wherein the third clock delay adjustment is computed as a ninety degree offset of the insertion delay as scaled by a ratio of the third clock frequency with respect to the second clock frequency.

\* \* \* \* \*